United States Patent
Shi et al.

(10) Patent No.: US 10,097,595 B2
(45) Date of Patent: Oct. 9, 2018

(54) DATA PROCESSING METHOD IN STREAM COMPUTING SYSTEM, CONTROL NODE, AND STREAM COMPUTING SYSTEM

(71) Applicant: Huawei Technologies Co., Ltd., Shenzhen (CN)

(72) Inventors: Yunlong Shi, Hangzhou (CN); Mingzhen Xia, Hangzhou (CN); Cheng He, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 193 days.

(21) Appl. No.: 15/257,722

(22) Filed: Sep. 6, 2016

(65) Prior Publication Data

US 2016/0373494 A1    Dec. 22, 2016

Related U.S. Application Data

(63) Continuation of application No. PCT/CN2015/071645, filed on Jan. 27, 2015.

(30) Foreign Application Priority Data

Mar. 6, 2014  (CN) .......................... 2014 1 0082041

(51) Int. Cl.
*H04L 29/06* (2006.01)
*G06F 9/50* (2006.01)
*H04L 12/26* (2006.01)
*H04L 12/911* (2013.01)

(52) U.S. Cl.
CPC ........ *H04L 65/4015* (2013.01); *G06F 9/5083* (2013.01); *H04L 43/045* (2013.01); *H04L 47/828* (2013.01)

(58) Field of Classification Search
CPC .................................................. H04L 65/4015
See application file for complete search history.

(56) References Cited

U.S. PATENT DOCUMENTS

| 6,535,518 B1 * | 3/2003 | Hu .......................... H04L 29/06 370/230 |
| 8,238,253 B2 * | 8/2012 | Morrill ............... H04L 41/5009 370/216 |
| 8,619,596 B2 * | 12/2013 | Wiley ................... H04L 67/141 370/229 |

(Continued)

FOREIGN PATENT DOCUMENTS

| CN | 101661406 A | 3/2010 |
| CN | 102082692 A | 6/2011 |

(Continued)

*Primary Examiner* — O. C. Vostal
(74) *Attorney, Agent, or Firm* — Slater Matsil, LLP

(57) ABSTRACT

A stream computer system and a method for processing a data stream in a stream computing system are disclosed. In an embodiment, the method includes collecting data traffic information between each working node and other working nodes and processing speed information for each working node, determining an optimized parallelism degree for each working node according to the collected data traffic information and processing speed information and adjusting a parallelism degree of the working node according to the optimized parallelism degree of the working node.

14 Claims, 7 Drawing Sheets

(56) References Cited

U.S. PATENT DOCUMENTS

| | | | |
|---|---|---|---|
| 2002/0154645 A1* | 10/2002 | Hu | H04L 29/06 370/401 |
| 2005/0027840 A1* | 2/2005 | Theobold | H04W 28/00 709/223 |
| 2008/0052387 A1* | 2/2008 | Heinz | H04L 41/5025 709/223 |
| 2009/0135944 A1* | 5/2009 | Dyer | H04L 25/0248 375/267 |
| 2010/0229178 A1* | 9/2010 | Ito | G06F 9/5083 718/104 |
| 2010/0306005 A1* | 12/2010 | Yengulalp | G06Q 10/06 705/7.27 |
| 2010/0306006 A1 | 12/2010 | Pavlov | |
| 2011/0016123 A1* | 1/2011 | Pandey | G06F 17/30348 707/737 |
| 2011/0040827 A1 | 2/2011 | Katsunuma et al. | |
| 2011/0041132 A1 | 2/2011 | Andrade et al. | |
| 2011/0145828 A1 | 6/2011 | Takahashi et al. | |
| 2012/0321052 A1* | 12/2012 | Morrill | H04L 29/06027 379/32.01 |
| 2013/0007753 A1* | 1/2013 | Jain | G06F 9/46 718/103 |
| 2013/0346390 A1* | 12/2013 | Jerzak | G06F 17/30103 707/719 |
| 2014/0059210 A1* | 2/2014 | Gedik | G06F 9/5066 709/224 |
| 2014/0280744 A1* | 9/2014 | DuBose | H04L 65/60 709/219 |
| 2016/0241435 A1* | 8/2016 | Iordache | H04L 41/0823 |

FOREIGN PATENT DOCUMENTS

| | | |
|---|---|---|
| CN | 102200906 A | 9/2011 |
| CN | 103164261 A | 6/2013 |
| CN | 103246570 A | 8/2013 |
| CN | 103870340 A | 6/2014 |
| JP | 2010204880 A | 9/2010 |
| JP | 2011039820 A | 2/2011 |
| JP | 2011128818 A | 6/2011 |
| JP | 2011243162 A | 12/2011 |
| JP | 2013225204 A | 10/2013 |
| WO | 2009078428 A1 | 6/2009 |

* cited by examiner

DATA PROCESSING METHOD IN STREAM COMPUTING SYSTEM, CONTROL NODE, AND STREAM COMPUTING SYSTEM

CROSS-REFERENCE TO RELATED APPLICATIONS

This application is a continuation of International Application No. PCT/CN2015/071645, filed on Jan. 27, 2015, which claims priority to Chinese Patent Application No. 201410082041.X, filed on Mar. 6, 2014, both of which are hereby incorporated by reference in their entireties.

TECHNICAL FIELD

The present invention relates to the field of computer technologies, and in particular, to a data processing method in a stream computing system, a control node, and a stream computing system.

BACKGROUND

Currently, data-intensive services have been widely applied, and typical data-intensive services include financial services, network monitoring, telecommunications data management, Web applications, and the like. In a data-intensive service, data is characterized by a large volume and a high speed, and is time varying. Therefore, it is not suitable to use a durable and stable relationship model to perform data modeling, but suitable to use a transient data stream model to perform data modeling, and therefore research on data stream computing emerges. Data stream computing is a pipeline-like data processing mode. Data stream computing comes from a concept that data value decreases as time elapses. Therefore, after an event triggers generation of data, the data needs to be processed as soon as possible. It is optimal that data is processed instantly as soon as the data is generated, that is, data processing is performed once instantly as soon as one event occurs, instead of buffering data for batch processing.

In a stream computing system, data stream computing is performed based on a streaming data processing model. As shown in FIG. 1, service data processing logic generally needs to be converted into a data processing mode shown in a directed acyclic graph (DAG; or referred to as a flow graph), an operator (Operator) in the graph bears a data processing operation, a data stream (stream) represents data transmission between Operators, and all Operators may be executed in a distributed mode.

In the prior art, a solution for setting a streaming data processing model for data stream computing is that: physical equipment (PE, or referred to as an execution unit) and logical units (generally marked as an Operator in a DAG graph, or referred to as a working node) are in a multiple-to-one relationship. Static configuration of a parallelism degree of an Operator is supported in this solution. That is, according to a parallelism degree that is of an Operator and statically configured by a user, each Operator invokes, in a service execution process, a corresponding quantity of execution units according to the parallelism degree, so as to process a data stream generated by a service.

Because a stream computing system generally is a distributed real-time stream processing system, processing conditions of tasks in the system change in real time. For a real-time changing condition, a parallelism degree initially set by a user is not optimal in many cases, and therefore, a streaming data processing model generated according to the parallelism degree initially set by the user cannot adapt to a real-time change of the system, thereby causing a waste of resources in the stream computing system and greatly limiting a data processing capability of the stream computing system.

SUMMARY

Embodiments of the invention provide a data processing method and a control node in a stream computing system, and the stream computing system, so as to adjust a parallelism degree of a working node in the stream computing system in real time according to a service processing condition, thereby improving a data processing capability and resource utilization of the stream computing system.

According to a first aspect, the embodiments of the invention provide a data processing method in a stream computing system, where the stream computing system includes a control node and multiple working nodes. The method includes invoking, by the control node according to a configured parallelism degree of each working node, one or more working nodes of the multiple working nodes to process a data stream, collecting, by the control node, information about data traffic between each working node of the one or more working nodes and other working nodes, and processing speed information of each working node of the one or more working nodes, determining, by the control node, an optimized parallelism degree of each working node of the one or more working nodes according to the collected data traffic information and processing speed information and separately determining, by the control node, whether the optimized parallelism degree of each working node of the one or more working nodes is the same as a parallelism degree of the working node, and if the optimized parallelism degree of each working node of the one or more working nodes is not the same as the parallelism degree of the working node, adjusting the parallelism degree of the working node according to the optimized parallelism degree of the working node.

With reference to the first aspect, in a first possible implementation manner, each working node includes one or more execution units, and when a working node is invoked to process a data stream, specifically an execution unit included in the working node processes the data stream; a parallelism degree of the working node indicates a quantity of execution units included in the working node; and the adjusting, by the control node. The parallelism degree of the working node according to the optimized parallelism degree of the working node includes adding, by the control node, at least one execution unit to the working node or deleting at least one execution unit of the working node according to the optimized parallelism degree of the working node, so that a parallelism degree of the working node that is represented by a quantity of execution units currently included in the working node is the same as the optimized parallelism degree of the working node.

With reference to the first possible implementation manner of the first aspect, in a second possible implementation manner, the adding, by the control node, at least one execution unit to the working node or deleting at least one execution unit of the working node according to the optimized parallelism degree of the working node includes when the optimized parallelism degree of the working node is greater than the parallelism degree of the working node, generating, by the control node, a first control instruction used to create a new execution unit, and sending the first control instruction to the working node, so that the working node creates at least one new execution unit after receiving the first control instruction, and creates a data channel between the new execution unit and another execution unit, where a parallelism degree of the working node that is represented by a total quantity of execution units currently included in the working node is the same as the optimized parallelism degree of the working node and when the optimized parallelism degree of the working node is less than the parallelism degree of the working node, generating, by the control node, a second control instruction used to delete an execution unit of the working node, and sending the second control instruction to the working node, so that the working node deletes at least one execution unit of the working node after receiving the second control instruction, and deletes a data channel connected to the deleted execution unit, where a parallelism degree of the working node that is represented by a total quantity of execution units currently included in the working node is the same as the optimized parallelism degree of the working node.

With reference to the first or the second possible implementation manner of the first aspect, in a third possible implementation manner, after the adding at least one execution unit to the working node or deleting at least one execution unit of the working node according to the optimized parallelism degree of the working node, the method further includes adjusting, by the control node according to the added or deleted at least one execution unit, a data distribution policy of an upstream working node corresponding to the working node, where the data distribution policy is used to indicate a data receiving device and a data volume of the data receiving device at the time of data receiving when the upstream working node distributes data and sending, by the control node, an adjusted data distribution policy to the upstream working node, so that after determining a target execution unit corresponding to a downstream target working node, the upstream working node correspondingly distributes data packets to the target execution unit according to the adjusted data distribution policy.

With reference to the first or the second possible implementation manner of the first aspect, in a fourth possible implementation manner, after the adding at least one execution unit to the working node or deleting at least one execution unit of the working node according to the optimized parallelism degree of the working node, the method further includes adjusting, by the control node according to the added or deleted at least one execution unit, a data distribution policy of an upstream working node corresponding to the working node and sending, by the control node, an adjusted data distribution policy to the upstream working node, so that the upstream working node determines, according to the adjusted data distribution policy, a working node group to which a target working node belongs, where the working node group includes at least one working node; and determines a downstream target working node from the working node group, and after determining a target execution unit corresponding to the target working node, correspondingly distributes data packets to the target execution unit.

According to a second aspect, embodiments of the invention provide a control node in a stream computing system, where the stream computing system includes the control node and multiple working nodes, and the control node includes an invoking unit configured to invoke, according to a configured parallelism degree of each working node, one or more working nodes of the multiple working nodes to process a data stream, an information collecting unit configured to collect information about data traffic between each working node of the one or more working nodes and other working nodes, and processing speed information of each working node of the one or more working nodes, a computing unit configured to determine an optimized parallelism degree of each working node of the one or more working nodes according to the data traffic information and the processing speed information that are collected by the information collecting unit and an adjusting unit, configured to separately determine whether the optimized parallelism degree of each working node of the one or more working nodes is the same as a parallelism degree of the working node, and if the optimized parallelism degree of each working node of the one or more working nodes is not the same as the parallelism degree of the working node, adjust the parallelism degree of the working node according to the optimized parallelism degree of the working node.

With reference to the second aspect, in a first possible implementation manner, each working node includes one or more execution units, and each working node invokes an execution unit of the working node itself to process a data stream; a parallelism degree of a working node indicates a quantity of execution units included in the working node; and in the aspect of adjusting the parallelism degree of the working node according to the optimized parallelism degree of the working node. The adjusting unit is configured to add at least one execution unit to the working node or delete at least one execution unit of the working node according to the optimized parallelism degree of the working node, so that a parallelism degree of the working node that is represented by a quantity of execution units currently included in the working node is the same as the optimized parallelism degree of the working node.

With reference to the first possible implementation manner of the second aspect, in a second possible implementation manner, in the aspect of adding at least one execution unit to the working node or deleting at least one execution unit of the working node according to the optimized parallelism degree of the working node. The adjustment unit includes a first adjusting module configured to, when the optimized parallelism degree of the working node is greater than the parallelism degree of the working node, generate a first control instruction used to add an execution unit, and send the first control instruction to the working node, so that the working node creates at least one new execution unit after receiving the first control instruction, and creates a data channel between the new execution unit and another execution unit, where a parallelism degree of the working node that is represented by a total quantity of execution units currently included in the working node is the same as the optimized parallelism degree of the working node and a second adjusting module configured to, when the optimized parallelism degree of the working node is less than the parallelism degree of the working node, generate a second control instruction used to delete an execution unit of the working node, and send the second control instruction to the working node, so that the working node deletes at least one execution unit of the working node after receiving the second control instruction, and deletes a data channel connected to the deleted execution unit, where a parallelism degree of the working node that is represented by a total quantity of execution units currently included in the working node is the same as the optimized parallelism degree of the working node.

With reference to the first or the second possible implementation manner of the second aspect, in a third possible implementation manner, the control node further includes a first distribution policy adjusting unit configured to: adjust, according to the added or deleted at least one execution unit, a data distribution policy of an upstream working node corresponding to the working node, and send an adjusted data distribution policy to the upstream working node, so that after determining a target execution unit corresponding to a downstream target working node, the upstream working node correspondingly distributes data packets to the target execution unit according to the adjusted data distribution policy, where the data distribution policy is used to indicate a data receiving device and a data volume of the data receiving device at the time of data receiving when the upstream working node distributes data.

With reference to the first or the second possible implementation manner of the second aspect, in a fourth possible implementation manner, the control node further includes a second distribution policy adjusting unit configured to adjust, according to the added or deleted at least one execution unit, a data distribution policy of an upstream working node corresponding to the working node, and send an adjusted data distribution policy to the upstream working node, so that the upstream working node determines, according to the adjusted data distribution policy, a working node group to which a target working node belongs, where the working node group includes at least one working node; and determines a downstream target working node from the working node group, and after determining a target execution unit corresponding to the target working node, correspondingly distributes data packets to the target execution unit.

According to a third aspect, the embodiments of the invention provide a stream computing system, where the stream computing system includes a control node and multiple working nodes, where the control node is configured to invoke, according to a configured parallelism degree of each working node of the stream computing system, one or more working nodes of the multiple working nodes to process a data stream, where the working node is configured to be invoked by the control node to process the data stream, and where the control node is further configured to collect information about data traffic between each working node of the one or more working nodes and other working nodes, and processing speed information of each working node of the one or more working nodes; determine an optimized parallelism degree of each working node of the one or more working nodes according to the collected data traffic information and processing speed information; and separately determine whether the optimized parallelism degree of each working node of the one or more working nodes is the same as a parallelism degree of the working node, and if the optimized parallelism degree of each working node of the one or more working nodes is not the same as the parallelism degree of the working node, adjust the parallelism degree of the working node according to the optimized parallelism degree of the working node.

With reference to the third aspect, in a first possible implementation manner, the working node includes one or more execution units, and when the working node is invoked to process a data stream, specifically an execution unit included in the working node processes the data stream; a parallelism degree of the working node indicates a quantity of execution units included in the working node; and in the aspect of adjusting the parallelism degree of the working node according to the optimized parallelism degree of the working node, the control node is specifically configured to add at least one execution unit to the working node or delete at least one execution unit of the working node according to the optimized parallelism degree of the working node, so that a parallelism degree of the working node that is represented by a quantity of execution units currently included in the working node is the same as the optimized parallelism degree of the working node.

With reference to the first possible implementation manner of the third aspect, in a second possible implementation manner, the control node is further configured to adjust, according to the added or deleted at least one execution unit, a data distribution policy of an upstream working node corresponding to the working node, and send an adjusted data distribution policy to the upstream working node, so that after determining a target execution unit corresponding to a downstream target working node, the upstream working node correspondingly distributes data packets to the target execution unit according to the adjusted data distribution policy, where the data distribution policy is used to indicate a data receiving device and a data volume of the data receiving device at the time of data receiving when the upstream working node distributes data.

With reference to the second possible implementation manner of the third aspect, in a third possible implementation manner, the control node is further configured to: adjust, according to the added or deleted at least one execution unit, a data distribution policy of an upstream working node corresponding to the working node, and send an adjusted data distribution policy to the upstream working node, so that the upstream working node determines, according to the adjusted data distribution policy, a working node group to which a target working node belongs, where the working node group includes at least one working node; and determines a downstream target working node from the working node group, and after determining a target execution unit corresponding to the target working node, correspondingly distributes data packets to the target execution unit.

In the technical solutions provided in the embodiments of the present invention, processing speed information of each working node and information about traffic between working nodes are collected in real time in a system operating process, and a parallelism degree of each working node is adjusted according to the collected real-time information, so that a processing capability of the working node can meet a real-time requirement of service processing, thereby dynamically improving a data processing capability and resource utilization of a stream computing system.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present invention clearer and more comprehensible, the following further describes the technical solutions provided in the present invention in detail with reference to the accompanying drawings and embodiments. Apparently, the described embodiments are merely some but not all of the embodiments of the present invention. All other embodiments obtained by a person of ordinary skill in the art based on the embodiments of the present invention without creative efforts shall fall within the protection scope of the present invention.

The following describes a main implementation principle, specific implementation manners, and corresponding achievable benefits of the technical solutions provided in the embodiments of the application with reference to the accompanying drawings.

Figure 1:
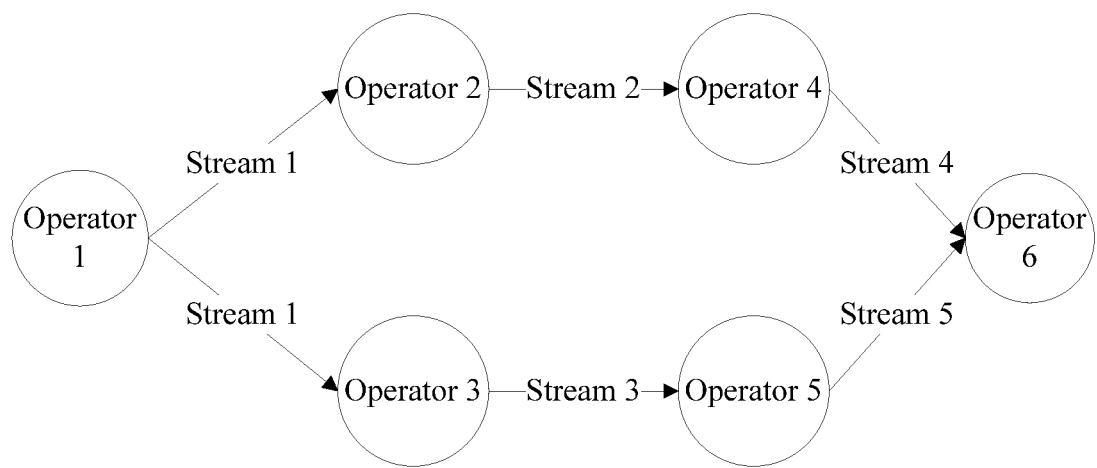
FIG. 1 is a schematic diagram of a DAG graph in the prior art.
Figure 2:
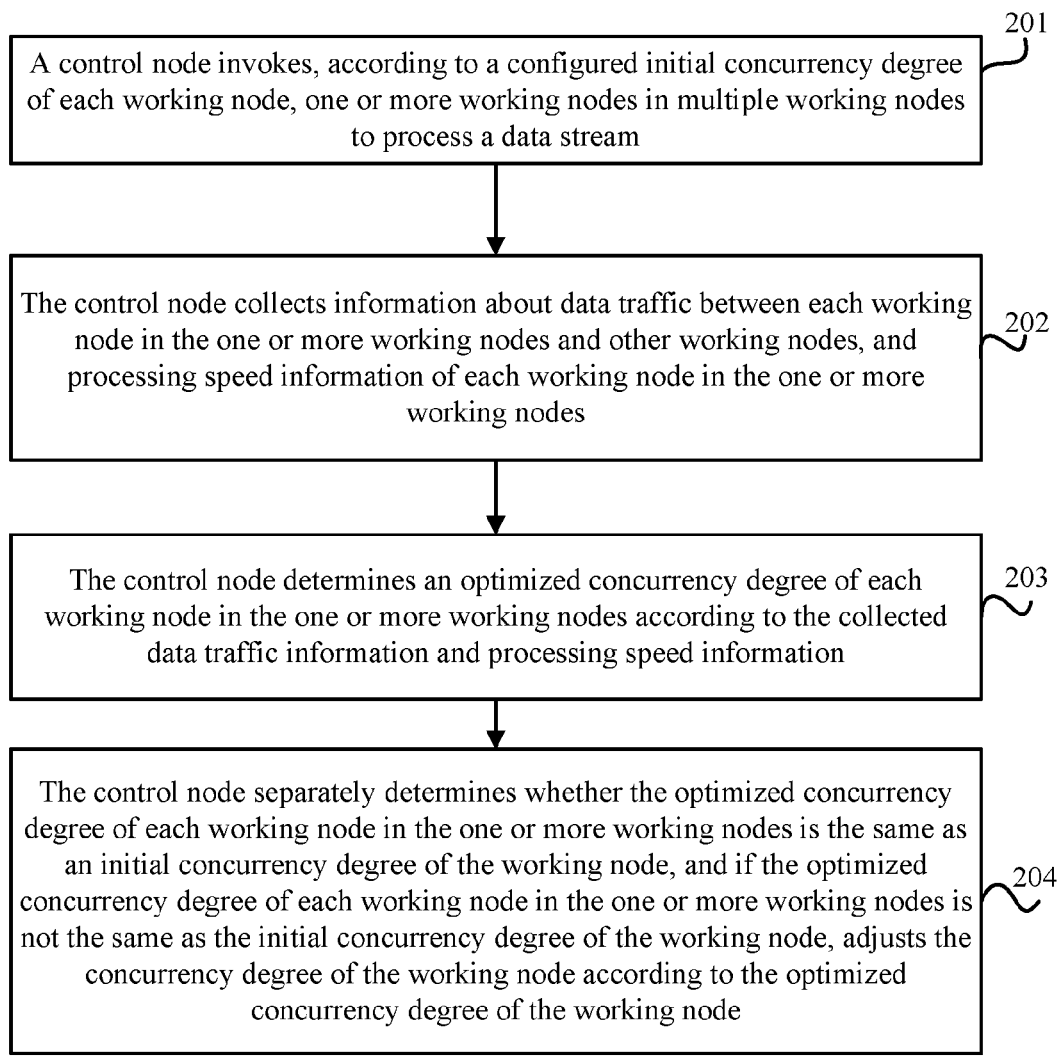
FIG. 2 is a flowchart of a data processing method in a stream computing system according to an embodiment of the present invention.

As shown in FIG. 2, an embodiment of the present invention provides a data processing method in a stream computing system. The method provided in this embodiment of the present invention may be used in the stream computing system, where the stream computing system generally includes a control node and multiple working nodes (also referred to as operators, Operator), and the control node may send a corresponding control instruction to a subordinated working node, so that the working node invokes, according to the control instruction, an execution unit to process a data stream generated by a service.

The data processing method provided in this embodiment of the present invention includes:

Step 201: The control node invokes, according to a configured parallelism degree of each working node, one or more working nodes of the multiple working nodes to process a data stream.

It should be noted that, a working node described in the present invention is generally referred to as an operator (Operator) in a stream computing system, and the two are not particularly differentiated in this embodiment of the present invention; a parallelism degree of each working node of the stream computing system is configured in a flow graph (also referred to as a directed acyclic graph) for describing service processing logic; when a service is being deployed in the stream computing system, generally an initial value (also referred to as an initial parallelism degree) of the parallelism degree of each working node is configured according to a service requirement, and then a control node invokes, according to the configured parallelism degree of each working node, one or more working nodes to process a data stream generated by the service, where the flow graph is a general representation form of service data processing logic in the stream computing system. For a specific introduction to the flow graph, reference may be made to description in the background, and details are not described herein again.

It should further be noted that, each working node includes one or more execution units, and when a working node is invoked to process a data stream, specifically an execution unit included in the working node processes the data stream, where the execution unit may be specifically a thread or a process; a parallelism degree of the working node is used to represent a correspondence between the working node and the execution unit, and specifically, the parallelism degree of the working node indicates a quantity of execution units included in the working node, for example, that a parallelism degree of a working node A is 5 indicates that the working node may invoke five execution units to process a data stream. The parallelism degree of the working node in this step refers to a parallelism degree initially configured for the working node.

Step 202: The control node collects information about data traffic between each working node of the one or more working nodes and other working nodes, and processing speed information of each working node of the one or more working nodes.

It should be noted that, information about traffic between working nodes refers to information about data traffic between working nodes that have a logical upstream and downstream relationship in a flow graph; speed information of a working node represents a data processing speed of the working node, and the data processing speed of the working node is determined by factors such as a parallelism degree and data traffic of the working node.

Step 203: The control node determines, according to the collected data traffic information and processing speed information, an optimized parallelism degree of each working node of the one or more working nodes.

An optimized parallelism degree of a working node refers to a parallelism degree matching a current load condition of the working node. In the prior art, an execution unit is invoked, only according to an initially configured parallelism degree, to process a data stream, but because a specific processing condition cannot be estimated before data processing is performed, an optimal effect cannot be achieved by using the initial parallelism degree in many cases. For the foregoing issue in the prior art, in the method provided in this embodiment of the present invention, a load condition of each working node of the stream computing system is collected (that is, collecting traffic information and processing speed information), and then a matching optimized parallelism degree is computed according to the collected load condition. The optimized parallelism degree can match a data processing condition of the working node, thereby avoiding the following problems: Resources are wasted and an execution unit cannot meet a data processing requirement.

Step 204: The control node separately determines whether the optimized parallelism degree of each working node of the one or more working nodes is the same as a parallelism degree of the working node, and if the optimized parallelism degree of each working node of the one or more working nodes is not the same as the parallelism degree of the working node, adjusts the parallelism degree of the working node according to the optimized parallelism degree of the working node.

It may be understood that, if the optimized parallelism degree of the working node is the same as the parallelism degree of the working node, it is unnecessary to adjust the parallelism degree of the working node, and the current parallelism degree of the working node is maintained. In addition, multiple implementation manners may be used for a specific algorithm for determining an optimized parallelism degree of each working node by using collected real-time data traffic information and processing speed information, which are described by using a specific example in the following, but the example should not be understood as the only manner for implementing the present invention.

In the stream computing system, when a arrival time of a tuple (or referred to as a data packet) in a data stream at a working node matches a time during which an execution unit processes the tuple, resource utilization in the system is optimal, thereby helping fully use a processing capability of the system. If the tuple arrival time is shorter than the tuple processing time, it indicates that the execution unit is overloaded, and an accumulation of tuples may occur in the system.

Figure 3:
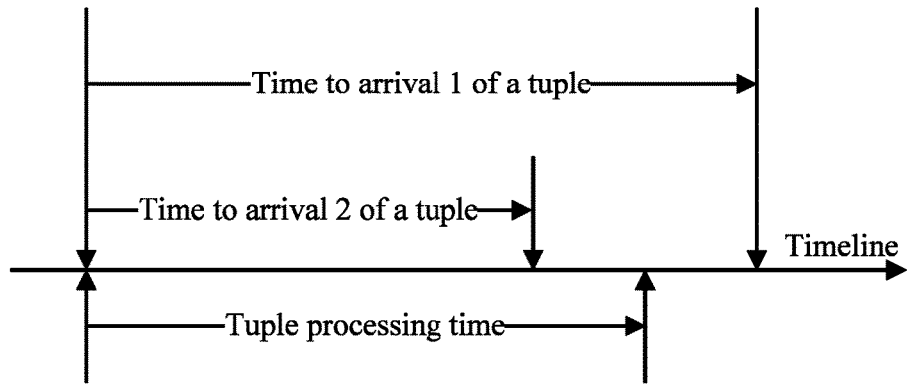
FIG. 3 is a schematic diagram of a correspondence between a tuple processing time and a tuple arrival time according to an embodiment of the present invention.

As shown in FIG. 3, for an execution unit, if arrival time 1 of a tuple at the execution unit is longer than a time during which a tuple service is processed (that is, the processing time), it indicates that the execution unit is relatively idle (as shown in FIG. 3, a relationship between the tuple arrival time 1 and the tuple processing time); if a tuple arrival time 2 is shorter than a tuple processing time, it indicates that the execution unit is heavy-loaded (as shown in FIG. 3, a relationship between the tuple arrival time 2 and the tuple processing time). A tuple arrival time is an average time interval at which a tuple arrives the execution unit, a tuple processing time is an average time required by the execution unit to process one tuple, and the tuple arrival time and the tuple processing time are obtained by means of computing according to collected information about traffic between working nodes and collected processing speed information of the execution unit.

For the two cases shown in FIG. 3, it is necessary to adjust a parallelism degree of a working node, so as to implement consistency between the tuple processing time and the tuple arrival time. An operational relationship between a tuple arrival time and a parallelism degree of a working node is that: a larger parallelism degree indicates a longer tuple arrival time of.

Figure 4:
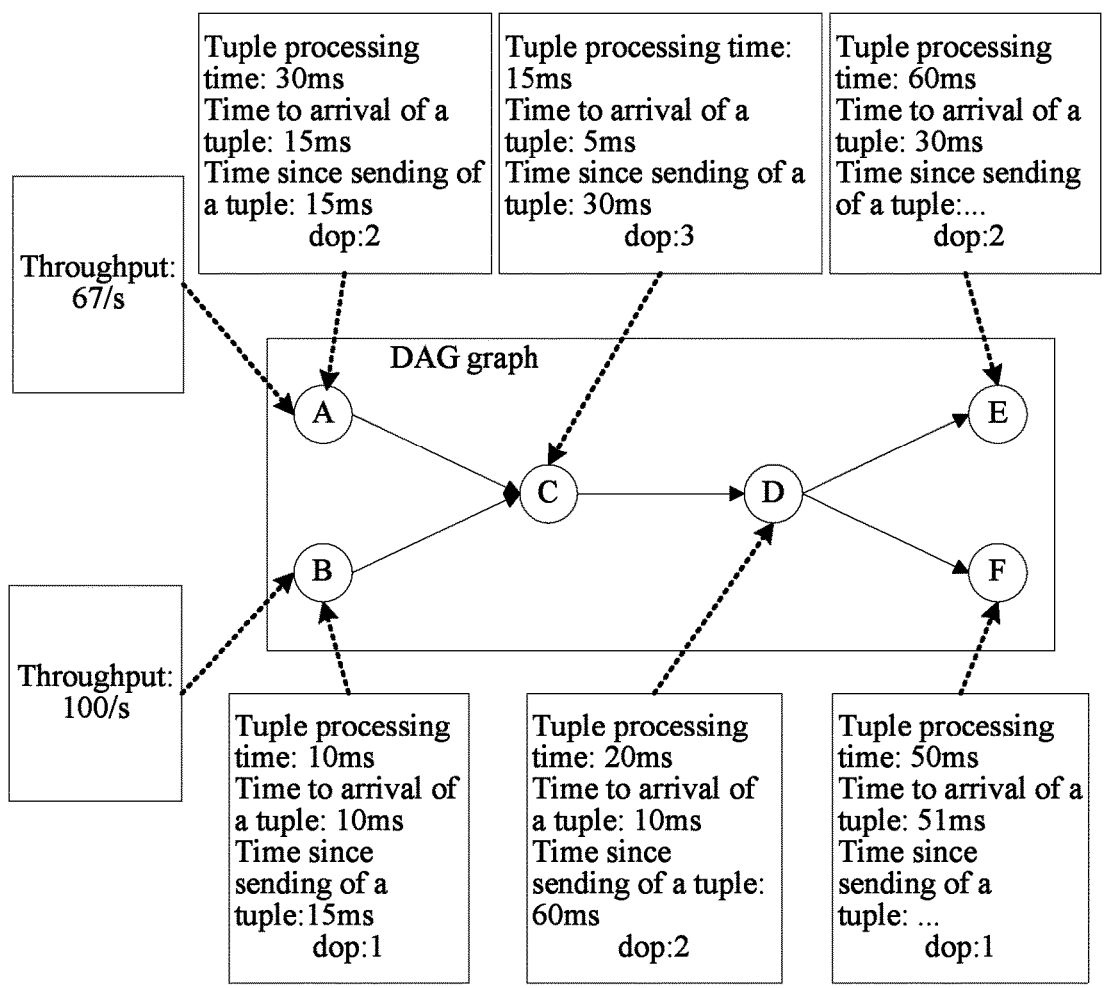
FIG. 4 is a schematic diagram of computing an optimized parallelism degree according to an embodiment of the present invention.

A flow graph shown in FIG. 4 is used as an example to further describe a method for computing an optimized parallelism degree in detail in this embodiment of the present invention.

A parallelism degree of each operator is computed layer by layer starting from a source of the flow graph (that is, a DAG graph), computing order is A, B, C, D, E, and F. Dop indicates a parallelism degree value, where a computational formula is as follows: dop≈quple processing time/tuple arrival time. The tuple processing time and the tuple arrival are obtained according to statistics information during service processing. The tuple arrival time is obtained by means of computing according to a time since a tuple of an upstream node is sent. For example, in FIG. 4, working node A (or referred to as operator A) is a source node, and a tuple arrival time is obtained according to a throughput, that is, 1s/67≈15 ms. A tuple arrival time at node C in the figure is computed according to the arrival time of a tuple from node A and node B. A parallelism degree of node A is 2, which is equivalent that node A transmits two tuples in 15 ms, and node B sends one tuple in 15 ms. Therefore, the arrival time of a tuple at node C is 15 ms/(1+2)=5 ms, and an optimized dop of node C≈15/5.

The foregoing manner of computing an optimized parallelism degree is an optional implementation manner in this embodiment of the present invention, and a manner of computing an optimized parallelism degree of the present invention is not limited to the foregoing manner. In a specific application environment, because different stream computing systems have different requirements and different specific device performance, manners of computing an optimized parallelism degree are different. The method provided in this embodiment of the present invention is applicable to any scenario in which processing logic in a stream computing system is adjusted according to an optimized parallelism degree after the optimized parallelism degree is computed according to a real-time condition.

When each working node includes one or more execution units, and a working node is invoked to process a data stream, after an optimized parallelism degree of each working node is computed according to the foregoing method, whether an initially set parallelism degree of each working node accords with a current processing condition may be determined by using the computed optimized parallelism degree. If the initially set parallelism degree of each working node does not match the current processing condition, the parallelism degree of the working node may be adjusted, and adjusting a parallelism degree of any of the working node according to the optimized parallelism degree includes: according to an optimized parallelism degree that is of a working node and needs to be adjusted, adding at least one execution unit to the working node, or deleting at least one execution unit of the working node, so that an adjusted parallelism degree of the working node is the same as a corresponding optimized parallelism degree.

In an optimal implementation manner, the adjusted parallelism degree is the same as the optimized parallelism degree. However, in a specific implementation process, because of restrictions of other objective conditions, a parallelism degree may be adjusted according to a, so that an adjusted parallelism degree is related to or close to the optimized parallelism degree. A specific effect after the adjusting is that a data processing capability of the working node can better adapt to a current data processing requirement in a system.

Relative to a actually required parallelism degree, an initially set parallelism degree is subject to two cases, that is, the initially set parallelism degree is extremely high or low. For these two cases, the following describes in detail an optional implementation manner for deleting or adding an execution unit, which specifically includes the following:

1. When an optimized parallelism degree of a working node whose execution unit needs to be adjusted is greater than an initial parallelism degree of the working node, the control node generates a first control instruction used to create a new execution unit, and sends the first control instruction to the working node, so that the working node creates at least one new execution unit after receiving the first control instruction, and creates a data channel between the new execution unit and another execution unit; after the adjusting, a parallelism degree of the working node that is represented by a total quantity of execution units currently included in the working node is the same as the optimized parallelism degree of the working node.

Specific implementation of creating the data channel between the new execution unit and the another execution unit may be: determining, according to a logical location of the working node in the flow graph, a first upstream working node and a first downstream working node that are logically connected to the new execution unit, where the first upstream working node is corresponding to at least one first upstream execution unit, and the first downstream working node is corresponding to at least one first downstream execution unit, and creating a data channel between the new execution unit and the first upstream execution unit, and a data channel between the new execution unit and the first downstream execution unit according to the first control instruction.

In this embodiment, when a data channel between a new execution unit and an upstream execution unit, and a data channel between the new execution unit and a downstream execution unit are being established, to avoid data omission, the data channel between the new execution unit and the downstream execution unit is generally first established, and then the data channel between the new execution unit and the upstream execution unit is correspondingly established.

2. When the optimized parallelism degree of the working node is less than the initial parallelism degree of the working node, the control node generates a second control instruction used to delete an execution unit of the working node, and sends the second control instruction to the working node, so that the working node deletes at least one execution unit of the working node after receiving the second control instruction, and deletes a data channel connected to the deleted execution unit; after the adjusting, a parallelism degree of the working node that is represented by a total quantity of execution units currently included in the working node is the same as the optimized parallelism degree of the working node.

Specific implementation steps of deleting the execution unit by the working node may be determining, according to the logical location of the working node in the flow graph, a second upstream working node and a second downstream working node that are logically connected to the to-be-deleted execution unit, where the second upstream working node is corresponding to at least one second upstream execution unit, and the second downstream working node is corresponding to at least one second downstream execution unit, deleting a data channel between the second upstream execution unit and the to-be-deleted execution unit, and a data channel between the second downstream execution unit and the to-be-deleted execution unit, and deleting the to-be-deleted execution unit.

In this embodiment, one or more execution units need to be deleted. To ensure smooth data processing, a specific operation during execution unit deleting may be first disconnecting a data channel between a to-be-deleted execution unit and an upstream execution unit; then, waiting for a to-be-deleted execution node to process data that is not completely processed; deleting a data channel between the to-be-deleted execution unit and a downstream execution unit after the data is completely processed; and finally, deleting the to-be-deleted execution unit.

In this embodiment of the present invention, because an execution unit is added or deleted, when an upstream working node of a working node whose parallelism degree is adjusted is distributing data, it is necessary to correspondingly adjust a data distribution policy. For example, an execution unit is added, it is necessary to distribute data to the added execution unit for processing. Therefore, after step 204 is performed, the method provided in this embodiment of the present invention further includes if a working node correspondingly adds or deletes at least one execution unit, correspondingly adjusting a data distribution policy of an upstream working node corresponding to the working node.

In the method provided in this embodiment of the present invention, a parallelism degree of a working node is adjusted, that is, it is necessary to add or delete a quantity of execution units, relative to an original working node. During execution unit adjusting, if a data distribution policy of an upstream working node is not adjusted, a problem may occur during data processing.

In a specific application scenario, it is necessary to correspondingly generate the data distribution policy according to the quantity of downstream execution units and a processing capability of each execution unit, and therefore, a specific instance of the data distribution policy includes a data distribution path, and a specific execution component corresponding to data distribution.

In this embodiment of the present invention, to improve data distribution efficiency, the following two optional data distribution policy planning solutions are provided, specifically including:

Manner 1: Two-Level Data Distribution

A data distribution policy of an upstream working node corresponding to any of the working node is adjusted according to an added or deleted at least one execution unit:

The control node adjusts, according to the added or deleted at least one execution unit, the data distribution policy of the upstream working node corresponding to the working node, where the data distribution policy is used to indicate a data receiving device and a data volume of the data receiving device at the time of data receiving when the upstream working node distributes data, and the control node sends an adjusted data distribution policy to the upstream working node, so that when distributing data packets to a downstream target working node according to the adjusted data distribution policy, the upstream working node determines a target execution unit corresponding to the target working node, and correspondingly distributes data packets to the target execution unit.

Figure 5:
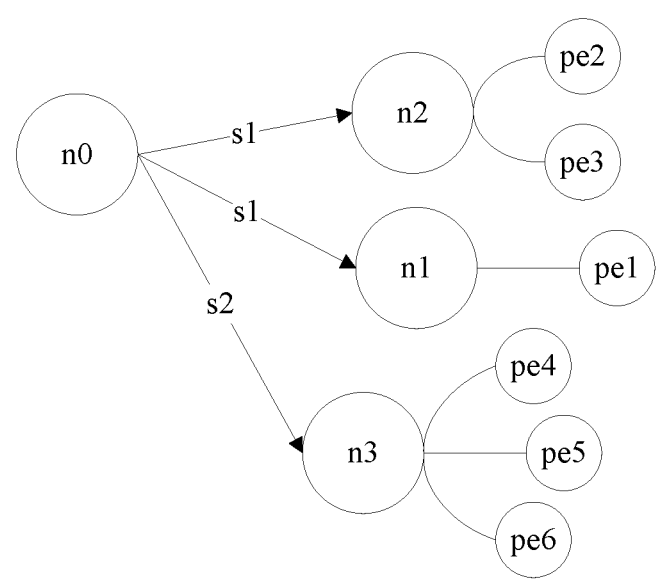
FIG. 5 is a schematic diagram of a fragment of a DAG graph according to an embodiment of the present invention.

A fragment of a DAG graph is used as an example in FIG. 5, where n0 represents an upstream operator, and n1, n2, and n3 respectively represent downstream operators of n0; n0 transmits two streams: s1 and s2, where n1 and n2 subscribe to stream s1, and n3 subscribes to stream s2. A parallelism degree of n1 is 1, and n1 is executed by one PE, that is, n1 is executed by pe1; a parallelism degree of n2 is 2, and n2 is executed by two PEs, that is, n2 is executed by pe2 and pe3; a parallelism degree of n3 is 3, and n3 is executed by three PEs, that is, n3 is executed by pe4, pe5, and pe6.

When n0 transmits tupleo (tuple) of stream s1, first level distribution is performed, that is, a target operator is selected. As shown in FIG. 5, target operators that may be selected in this embodiment are n1 and n2. Then, second level distribution is separately performed for n1 and n2; when the second level distribution is performed for n1, the parallelism degree of n1 is 1, and therefore, it is directly determined that tupleo is distributed to pe1; when the second level distribution is performed for n2, the parallelism degree of n2 is 2, and therefore, it is necessary to perform data distribution according to a distribution policy configured for n2. Hash distribution may be configured in this embodiment, that is, first corresponding hash values are obtained by performing hash computation on some attribute fields of tupleo; then, a modulo operation is performed according to the parallelism degree; and a result may be used as an index value to select a PE corresponding to n2. If multi-concurrency is set for a downstream operator, and the downstream operator subscribes to a stream transmitted by an upstream operator, a corresponding data distribution policy needs to be set. The distribution policy may be expanded according to a specific embodiment, for example, a corresponding embodiment may support random data distribution (that is, a stream is randomly distributed to a PE corresponding to a downstream operator), all distribution (that is, a stream is distributed to all PEs corresponding to a downstream operator), and hash distribution (that is, a PE to which a stream is to be distributed is determined in a manner of performing a modulo operation according to a hash value).

Manner 2: Multi-Level Data Distribution

The control node adjusts, according to an added or deleted at least one execution unit, a data distribution policy of an upstream working node corresponding to the working node, and the control node sends an adjusted data distribution policy to the upstream working node, so that the upstream working node determines, according to the adjusted data distribution policy, a working node group to which the target working node belongs, where the working node group includes at least one working node; and determines a downstream target working node from the working node group, and after determining a target execution unit corresponding to the target working node, correspondingly distributes data packets to the target execution unit.

Based on adjusting of a parallelism degree of an operator, a multi-level data distribution solution is further provided in the solution provided in this embodiment of the present invention, which can improve the parallelism degree of the operator, and at the same time, can further ensure an effect of accurate data distribution.

Figure 6:
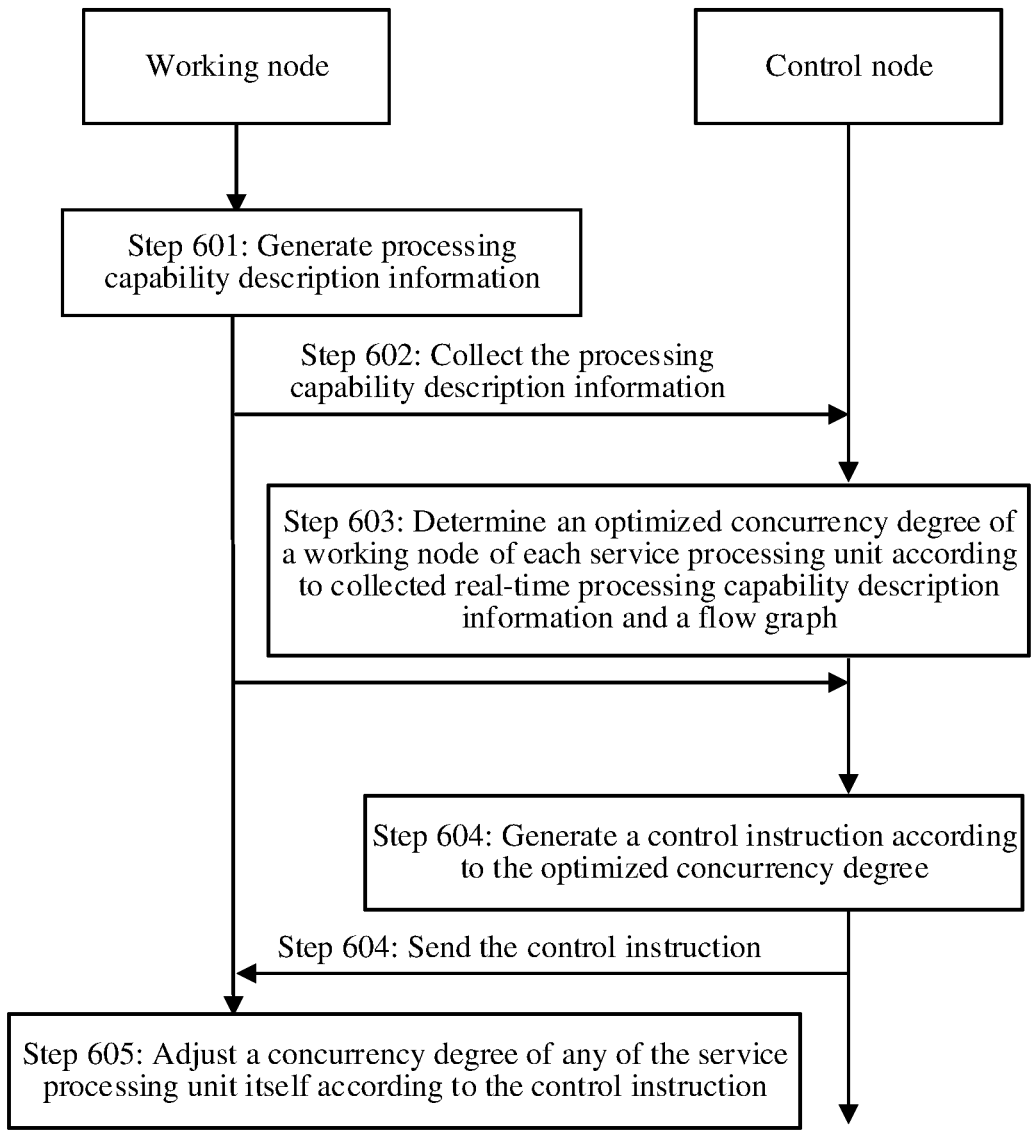
FIG. 6 is a flowchart of another data processing method in a stream computing system according to an embodiment of the present invention.

As shown in FIG. 6, to describe the method provided in the present invention in more detail, the following further describes the method provided in the present invention with reference to an applicable environment of the method in the present invention. The method provided in this embodiment of the present invention is applied to a stream computing system. A control node of the stream computing system invokes, according to a configured flow graph, one or more working nodes to process a data stream generated by a service, where the flow graph includes an initial parallelism degree preset for each working node, and specific steps include:

Step 601: A working node collects information about a processing speed at which the working node processes a data stream, and information about data traffic between the working node and other working nodes, combines the collected processing speed information and data traffic information so as to generate processing capability description information, and sends the processing capability description information to a corresponding control node.

Step 602: The control node collects processing capability description information of each invoked working node.

Step 603: The control node determines an optimized parallelism degree of each working node according to collected real-time processing capability description information and the flow graph.

Step 604: The control node determines whether the optimized parallelism degree of each working node is the same as an initial parallelism degree of the working node in the flow graph, and if the optimized parallelism degree of each working node is not the same as the initial parallelism degree of the working node in the flow graph, generates a control instruction according to the optimized parallelism degree, and sends the control instruction to the working node.

Step 605: The working node adjusts the parallelism degree of the working node itself according to the control instruction after receiving the control instruction.

For a characteristic that a processing condition of each task in a distributed real-time stream processing system changes in real time, in the method provided in this embodiment of the present invention, a processing condition of each working node is collected in real time in a system operating process, and then a parallelism degree of a working node is adjusted according to the real-time processing condition, so that a processing capability of the working node can meet a real-time requirement of service processing, thereby achieving an effect of dynamically improving a data processing capability and resource utilization of a stream computing system.

Figure 7:
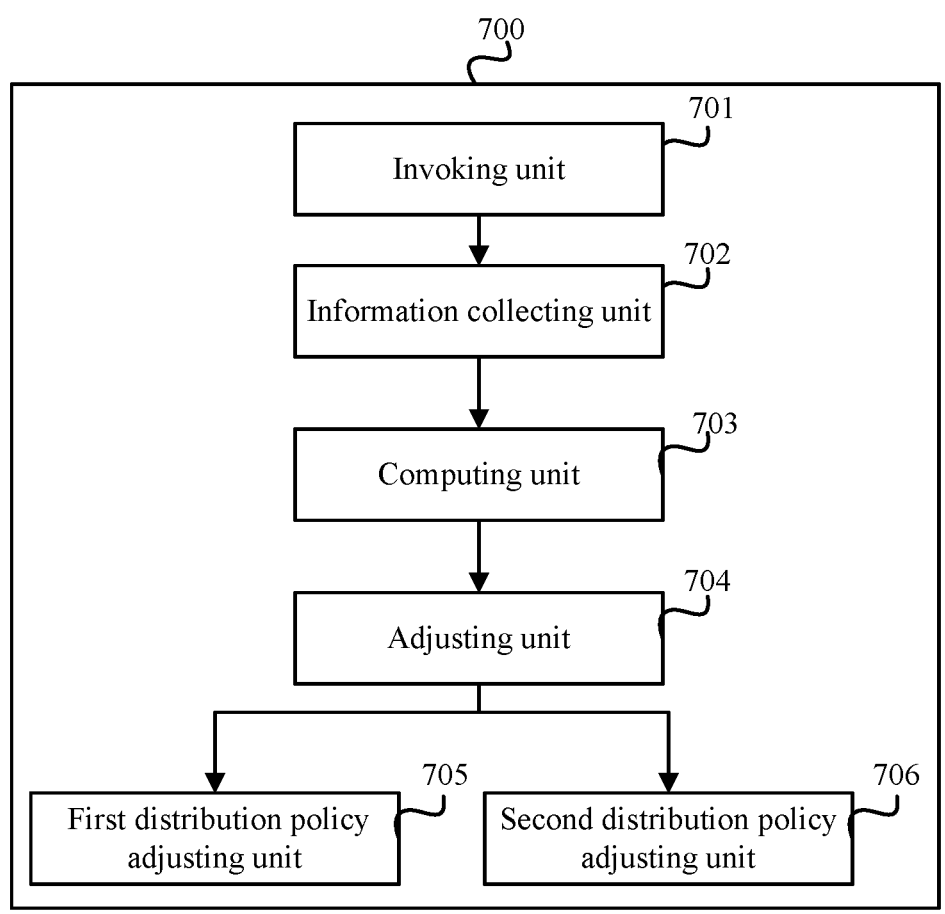
FIG. 7 is a schematic structural diagram of a control node in a stream computing system according to an embodiment of the present invention.

As shown in FIG. 7, the present invention further provides a control node 700 in a stream computing system according to the foregoing method, where the stream computing system includes the control node and multiple working nodes, and the control node includes an invoking unit 701, configured to invoke, according to a configured parallelism degree of each working node, one or more working nodes of the multiple working nodes to process a data stream, an information collecting unit 702, configured to collect information about data traffic between each working node of the one or more working nodes and other working nodes, and processing speed information of each working node of the one or more working nodes, a computing unit 703, configured to determine an optimized parallelism degree of each working node of the one or more working nodes according to the data traffic information and the processing speed information that are collected by the information collecting unit 702 and an adjusting unit 704, configured to separately determine whether the optimized parallelism degree of each working node of the one or more working nodes is the same as an initial parallelism degree of the working node, and if the optimized parallelism degree of each working node of the one or more working nodes is not the same as the initial parallelism degree of the working node, adjust the parallelism degree of the working node according to the optimized parallelism degree of the working node.

Optionally, each working node includes one or more execution units, and each working node invokes an execution unit of the working node itself to process a data stream; a parallelism degree of a working node indicates a quantity of execution units included in the working node; and in the aspect of adjusting the parallelism degree of the working node according to the optimized parallelism degree of the working node, the adjusting unit 704 is specifically configured to adding at least one execution unit to the working node or deleting at least one execution unit of the working node according to the optimized parallelism degree of the working node, so that an adjusted parallelism degree of the working node is consistent with the corresponding optimized parallelism degree.

Relative to a actually required parallelism degree, an initially set parallelism degree is subject to two cases: The initially set parallelism degree is extremely high or low. In the aspect of adding at least one execution unit to the working node or deleting at least one execution unit of the working node according to the optimized parallelism degree of the working node, the adjusting unit 704 includes a first adjusting module, configured to: when the optimized parallelism degree of the working node is greater than the initial parallelism degree of the working node, generate a first control instruction used to add an execution unit, and send the first control instruction to the working node, so that the working node creates at least one new execution unit after receiving the first control instruction, and creates a data channel between the new execution unit and another execution unit, and a second adjusting module, configured to: when the optimized parallelism degree of the working node is less than the initial parallelism degree of the working node, generate a second control instruction used to delete an execution unit of the working node, and send the second control instruction to the working node, so that the working node deletes at least one execution unit of the working node after receiving the second control instruction, and deletes a data channel connected to the deleted execution unit.

Optionally, in addition to improving a parallelism degree of an operator, the solution provided in this embodiment of the present invention needs to ensure accurate data distribution, and therefore, the control node further includes a first distribution policy adjusting unit 705, configured to: adjust, according to the added or deleted at least one execution unit, a data distribution policy of an upstream working node corresponding to the working node, and send an adjusted data distribution policy to the upstream working node, so that after determining a target execution unit corresponding to a downstream target working node, the upstream working node correspondingly distributes data packets to the target execution unit according to the adjusted data distribution policy, where the data distribution policy is used to indicate a data receiving device and a data volume of the data receiving device at the time of data receiving when the upstream working node distributes data, and a second distribution policy adjusting unit 706, configured to: adjust, according to the added or deleted at least one execution unit, a data distribution policy of an upstream working node corresponding to the working node, and send an adjusted data distribution policy to the upstream working node, so that the upstream working node determines, according to the adjusted data distribution policy, a working node group to which the target working node belongs, where the working node group includes at least one working node; and determines a downstream target working node from the working node group, and after determining a target execution unit corresponding to the target working node, correspondingly distributes data packets to the target execution unit.

The control node 700 in the stream computing system provided in this embodiment of the present invention is used to implement the data processing methods described in the foregoing method embodiments. For specific implementation details, reference may be made to the foregoing method embodiments, and details are not described herein again.

The control node in the stream computing system provided in this embodiment of the present invention collects a processing condition of each working node of real time in an operating process of the stream computing system, and then adjusts a parallelism degree of a working node according to the real-time processing condition, so that a processing capability of the working node can meet a real-time requirement of service processing, thereby achieving an effect of dynamically improving a data processing capability and resource utilization of the stream computing system.

Figure 8:
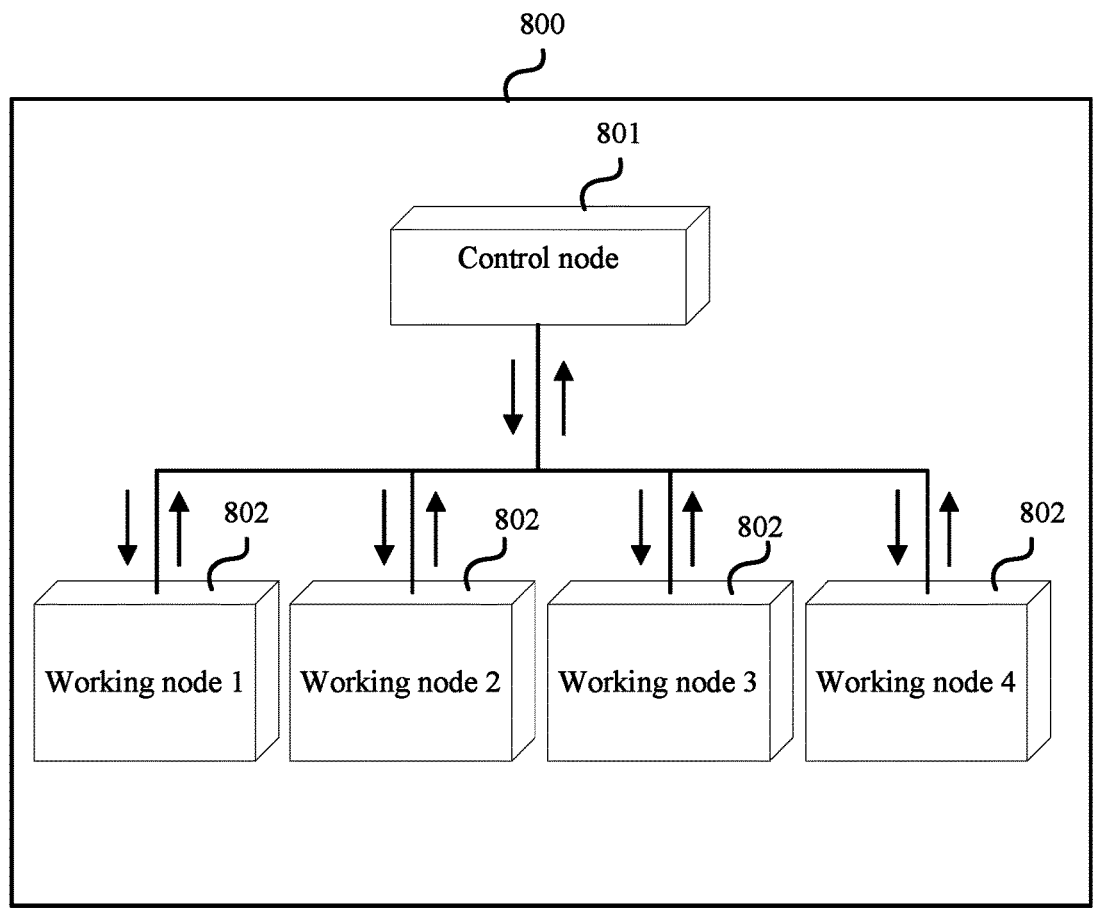
FIG. 8 is a schematic diagram of a stream computing system according to an embodiment of the present invention.

As shown in FIG. 8, based on the data processing method provided in the foregoing embodiments, an embodiment of the present invention further provides a stream computing system 800, where the stream computing system 800 includes: a control node 801 and multiple working nodes 802.

The control node 801 is configured to invoke, according to a configured parallelism degree of each working node 802 in the stream computing system, one or more working nodes of the multiple working nodes to process a data stream generated by a service.

The working node 802 is configured to be invoked by the control node 801 to process the data stream generated by the service.

The control node 801 is further configured to: collect information about data traffic between each working node of the one or more working nodes and other working nodes, and processing speed information of each working node of the one or more working nodes; determine an optimized parallelism degree of each working node of the one or more working nodes according to the collected data traffic information and processing speed information; and separately determine whether the optimized parallelism degree of each working node of the one or more working nodes is the same as a parallelism degree of the working node, and if the optimized parallelism degree of each working node of the one or more working nodes is not the same as the parallelism degree of the working node, adjust the parallelism degree of the working node according to the optimized parallelism degree of the working node.

According to an embodiment, a working node includes one or more execution units, and when the working node is invoked to process a data stream, specifically an execution unit included in the working node processes the data stream; a parallelism degree of the working node indicates a quantity of execution units included in the working node; and in the aspect of adjusting the parallelism degree of the working node according to the optimized parallelism degree of the working node, the control node 801 is specifically configured to send a control instruction to the working node 802, where the control instruction is generated according to an optimized parallelism degree of the working node 802.

Correspondingly, the working node 802 is further configured to add at least one execution unit or delete at least one execution unit of the working node 802 according to the control instruction, so that a parallelism degree of the working node 802 that is represented by a quantity of execution units currently included in the working node 802 is the same as the optimized parallelism degree of the working node 802.

According to an embodiment, the control node 801 is further configured to: adjust, according to the added or deleted at least one execution unit, a data distribution policy of an upstream working node corresponding to the working node 802, and send an adjusted data distribution policy to the upstream working node, so that after determining a target execution unit corresponding to a downstream target working node, the upstream working node correspondingly distributes data packets to the target execution unit according to the adjusted data distribution policy, where the data distribution policy is used to indicate a data receiving device and a data volume of the data receiving device at the time of data receiving when the upstream working node distributes data.

According to an embodiment, the control node 801 is further configured to: adjust, according to the added or deleted at least one execution unit, a data distribution policy of an upstream working node corresponding to the working node, and send an adjusted data distribution policy to the upstream working node, so that the upstream working node determines, according to the adjusted data distribution policy, a working node group to which the target working node belongs, where the working node group includes at least one working node; and determines a downstream target working node from the working node group, and after determining a target execution unit corresponding to the target working node, correspondingly distributes data packets to the target execution unit.

According to the stream computing system provided in this embodiment of the present invention, processing speed information of each working node and information about traffic between working nodes are collected in real time in a system operating process, and a parallelism degree of a working node is adjusted according to the collected real-time information, so that a processing capability of the working node can meet a real-time requirement of service processing, thereby achieving an effect of dynamically improving a data processing capability and resource utilization of the stream computing system.

Figure 9:
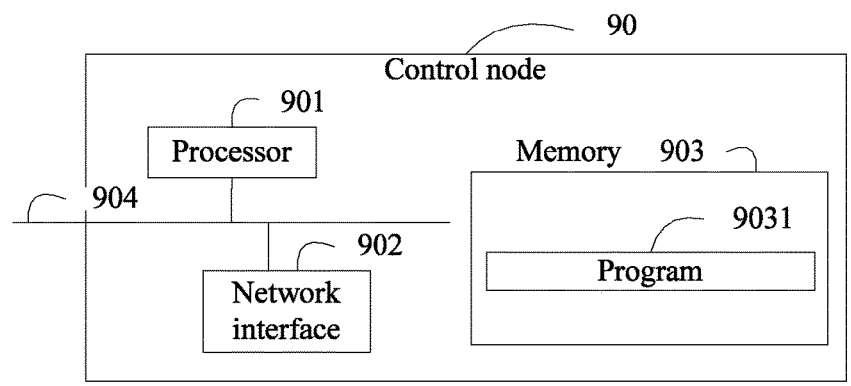
FIG. 9 is a schematic structural diagram of another control node in a stream computing system according to an embodiment of the present invention.

As shown in FIG. 9, the present invention further provides a control node, configured to execute the data processing method in the foregoing embodiments, where the control node includes at least one processor 901 (for example, a CPU), at least one network interface or other communications interface 902, a memory 903, and at least one communications bus 904 that is configured to implement connections and communication between these apparatuses. The processor 901 is configured to execute an executable module stored in the memory 903, for example, a computer program. The memory 903 may include a high-speed random access memory (RAM: Random Access Memory) and may further include a non-volatile memory (non-volatile memory), for example, at least one disk memory. Through at least one network interface 902 (with or without a cable), the control node implements communication with and a connection to at least one other network element, where the Internet, a wide area network, a local area network, a metropolitan area network, and the like may be used.

In some implementation manners, the memory stores a program 9031, where the program may be executed by the processor so as to: invoke, according to a configured parallelism degree of each working node, one or more working nodes of the multiple working nodes to process a data stream; collect information about data traffic between each working node of the one or more working nodes and other working nodes, and processing speed information of each working node of the one or more working nodes; determine an optimized parallelism degree of each working node of the one or more working nodes according to the collected data traffic information and processing speed information; separately determine whether the optimized parallelism degree of each working node of the one or more working nodes is the same as a parallelism degree of the working node, and if the optimized parallelism degree of each working node of the one or more working nodes is not the same as the parallelism degree of the working node, adjust the parallelism degree of the working node according to the optimized parallelism degree of the working node.

One or more foregoing technical solutions in the embodiments of this application have at least the following technical effects:

For a characteristic that a processing condition of each task in a distributed real-time stream processing system changes in real time, in the methods provided in the embodiments of the present invention, a processing condition of each working node is collected in real time in a system operating process, and then a parallelism degree of a working node is adjusted according to the real-time processing condition, so that a processing capability of the working node can meet a real-time requirement of service processing, thereby achieving an effect of dynamically improving a data processing capability and resource utilization of a stream computing system.

The methods described in the present invention are not limited to the embodiments described in the description of embodiments. Other implementation manners obtained by persons skilled in the art according to the technical solutions of the present invention still fall into the technical innovation scope of the present invention.

Obviously, a person skilled in the art can make various modifications and variations to the present invention without departing from the scope of the present invention. The present invention is intended to cover these modifications and variations provided that they fall within the scope of protection defined by the following claims and their equivalent technologies.

What is claimed is:

1. A method for processing a data stream in a stream computing system, wherein the stream computing system comprises a control node and multiple working nodes, the method comprising:

invoking, by the control node according to a configured parallelism degree for each working node, one or more working nodes of the multiple working nodes to process the data stream;

collecting, by the control node, data traffic information between each working node of the one or more working nodes and other working nodes, and processing speed information for each working node of the one or more working nodes;

determining, by the control node, an optimized parallelism degree for each working node of the one or more working nodes according to the collected data traffic information and processing speed information; and determining, by the control node, whether the optimized parallelism degree for each respective working node of the one or more working nodes is the same as a parallelism degree of the respective working node, and if the optimized parallelism degree of the respective working node is not the same as the parallelism degree of the respective working node, adjusting the parallelism degree of the respective working node according to the optimized parallelism degree of the respective working node.

2. The method according to claim 1, wherein each working node comprises one or more execution units, wherein a data stream is processed by an execution unit of a working node when the working node is invoked to process the data stream, wherein a plurality of execution units indicate a parallelism degree of a working node, and wherein adjusting the parallelism degree of the respective working node according to the optimized parallelism degree of the respective working node comprises adding, by the control node, at least one execution unit to the respective working node or deleting at least one execution unit of the respective working node according to the optimized parallelism degree of the respective working node so that a parallelism degree of the respective working node that is represented by a quantity of execution units currently comprised in the respective invoking node is the same as the optimized parallelism degree of the respective working node.

3. The method according to claim 2, wherein adding, by the control node, at least one execution unit to the respective working node or deleting at least one execution unit of the respective working node according to the optimized parallelism degree of the respective working node comprises:

generating, by the control node, a first control instruction used to create a new execution unit, and sending the first control instruction to the respective working node so that the respective working node creates at least one new execution unit after receiving the first control instruction and creates a data channel between the new execution unit and another execution unit when the optimized parallelism degree of the respective working node is greater than the parallelism degree of the respective working node; and generating, by the control node, a second control instruction used to delete an execution unit of the respective working node, and sending the second control instruction to the respective working node, so that the respective working node deletes at least one execution unit of the respective working node after receiving the second control instruction and deletes a data channel connected to the deleted execution unit when the optimized parallelism degree of the respective working node is less than the parallelism degree of the respective working node.

4. The method according to claim 2, further comprising:
after adding at least one execution unit to the respective working node or deleting at least one execution unit of the respective working node according to the optimized parallelism degree of the respective working node, adjusting, by the control node according to the added or deleted at least one execution unit, a data distribution policy of an upstream working node corresponding to the respective working node, wherein the data distribution policy is used to indicate a data receiving device and a data volume of the data receiving device at a time of data receiving when the upstream working node distributes data; and
sending, by the control node, an adjusted data distribution policy to the upstream working node so that after determining a target execution unit corresponding to a downstream target working node, the upstream working node correspondingly distributes data packets to the target execution unit according to the adjusted data distribution policy.

5. The method according to claim 2, further comprising, after adding at least one execution unit to the respective working node or deleting at least one execution unit of the respective working node according to the optimized parallelism degree of the respective working node:
adjusting, by the control node according to the added or deleted at least one execution unit, a data distribution policy of an upstream working node corresponding to the respective working node; and
sending, by the control node, an adjusted data distribution policy to the upstream working node, so that the upstream working node determines, according to the adjusted data distribution policy, a working node group to which a target working node belongs, wherein the working node group comprises at least one working node; and determines a downstream target working node from the working node group, and after determining a target execution unit corresponding to the target working node, correspondingly distributes data packets to the target execution unit.

6. A control node in a stream computing system, wherein the stream computing system comprises the control node and multiple working nodes, and wherein the control node comprises a processor, and a non-transitory memory coupled to the processor, the processor is configured to execute instructions stored in the memory so as to:
invoke, according to a configured parallelism degree for each working node, one or more working nodes of the multiple working nodes to process a data stream;
collect data traffic information between each working node of the one or more working nodes and other working nodes, and processing speed information for each working node of the one or more working nodes;
determine an optimized parallelism degree for each working node of the one or more working nodes according to the data traffic information and the processing speed information; and
determine whether the optimized parallelism degree for each respective working node of the one or more working nodes is the same as a parallelism degree of the respective working node, and when the optimized parallelism degree of the respective working node is not the same as the parallelism degree of the respective working node, adjust the parallelism degree of the respective working node according to the optimized parallelism degree of the respective working node.

7. The control node according to claim 6, wherein each working node comprises one or more execution units, wherein a data stream is processed by an execution unit of a working node when the working node is invoked to process the data stream, wherein a plurality of execution units indicate a parallelism degree of a working node, and wherein the processor is configured to execute instructions stored in the memory so as to add at least one execution unit to the respective working node or delete at least one execution unit of the respective working node according to the optimized parallelism degree of the respective working node so that a parallelism degree of the respective working node that is represented by a quantity of execution units currently comprised in the respective working node is the same as the optimized parallelism degree of the respective working node.

8. The control node according to claim 7, wherein the processor is further configured to execute instructions stored in the memory so as to:
generate a first control instruction used to add an execution unit when the optimized parallelism degree of the respective working node is greater than the parallelism degree of the respective working node, and send the first control instruction to the respective working node so that the respective working node creates at least one new execution unit after receiving the first control instruction, and creates a data channel between the new execution unit and another execution unit, wherein a parallelism degree of the respective working node that is represented by a total quantity of execution units currently comprised in the respective working node is the same as the optimized parallelism degree of the respective working node; and
generate a second control instruction used to delete an execution unit of the respective working node when the optimized parallelism degree of the respective working node is less than the parallelism degree of the respective working node, and send the second control instruction to the respective working node, so that the respective working node deletes at least one execution unit of the respective working node after receiving the second control instruction, and deletes a data channel connected to the deleted execution unit, wherein a parallelism degree of the respective working node that is represented by a total quantity of execution units currently comprised in the respective working node is the same as the optimized parallelism degree of the respective working node.

9. The control node according to claim 7, wherein the processor is further configured to execute instructions stored in the memory so as to adjust, according to the added or deleted at least one execution unit, a data distribution policy of an upstream working node corresponding to the respective working node, and send an adjusted data distribution policy to the upstream working node, so that after determining a target execution unit corresponding to a downstream target working node, the upstream working node correspondingly distributes data packets to the target execution unit according to the adjusted data distribution policy, wherein the data distribution policy is used to indicate a data receiving device and a data volume of the data receiving device at a time of data receiving when the upstream working node distributes data.

10. The control node according to claim 7, wherein the processor is further configured to execute instructions stored in the memory so as to adjust, according to the added or deleted at least one execution unit, a data distribution policy of an upstream working node corresponding to the respective working node, and send an adjusted data distribution policy to the upstream working node, so that the upstream working node determines, according to the adjusted data distribution policy, a working node group to which a target working node belongs, wherein the working node group comprises at least one working node; and determines a downstream target working node from the working node group, and after determining a target execution unit corresponding to the target working node, correspondingly distributes data packets to the target execution unit.

11. A stream computing system comprising:
a control node; and
multiple working nodes,
wherein the control node is configured to invoke, according to a configured parallelism degree for each working node of the stream computing system, one or more working nodes of the multiple working nodes to process a data stream,
wherein the working node is configured to be invoked by the control node to process the data stream,
wherein the control node is further configured to:
collect data traffic information between each working node of the one or more working nodes and other working nodes, and processing speed information for each working node of the one or more working nodes;
determine an optimized parallelism degree for each working node of the one or more working nodes according to the collected data traffic information and processing speed information; and
determine whether the optimized parallelism degree for each respective working node of the one or more working nodes is the same as a parallelism degree of the respective working node, and if the optimized parallelism degree of the respective working node is not the same as the parallelism degree of the respective working node, adjust the parallelism degree of the respective working node according to the optimized parallelism degree of the respective working node.

12. The stream computing system according to claim 11, wherein each working node comprises one or more execution units, wherein a data stream is processed by an execution unit of a working node when the working node is invoked to process the data stream, wherein a plurality of execution units indicate a parallelism degree of a working node, and wherein the control node is specifically configured to add at least one execution unit to the respective working node or delete at least one execution unit of the respective working node according to the optimized parallelism degree of the respective working node, so that a parallelism degree of the respective working node that is represented by a quantity of execution units currently comprised in the respective working node is the same as the optimized parallelism degree of the respective working node.

13. The stream computing system according to claim 12, wherein the control node is further configured to adjust, according to the added or deleted at least one execution unit, a data distribution policy of an upstream working node corresponding to the respective working node, and send an adjusted data distribution policy to the upstream working node, so that after determining a target execution unit corresponding to a downstream target working node, the upstream working node correspondingly distributes data packets to the target execution unit according to the adjusted data distribution policy, wherein the data distribution policy is used to indicate a data receiving device and a data volume of the data receiving device at a time of data receiving when the upstream working node distributes data.

14. The stream computing system according to claim 12, wherein the control node is further configured to adjust, according to the added or deleted at least one execution unit, a data distribution policy of an upstream working node corresponding to the respective working node, and send an adjusted data distribution policy to the upstream working node so that the upstream working node determines, according to the adjusted data distribution policy, a working node group to which a target working node belongs, wherein the working node group comprises at least one working node, and determines a downstream target working node from the working node group, and after determining a target execution unit corresponding to the target working node, correspondingly distributes data packets to the target execution unit.

* * * * *